United States Patent
Shiono

(10) Patent No.: US 7,855,256 B2
(45) Date of Patent: Dec. 21, 2010

(54) FLUOROPOLYETHER ADHESIVE COMPOSITION

(75) Inventor: Mikio Shiono, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 415 days.

(21) Appl. No.: 12/081,076

(22) Filed: Apr. 10, 2008

(65) Prior Publication Data

US 2008/0269389 A1    Oct. 30, 2008

Related U.S. Application Data

(62) Division of application No. 11/070,160, filed on Mar. 3, 2005, now abandoned.

(30) Foreign Application Priority Data

Mar. 5, 2004 (JP) ............................. 2004-063206
Feb. 25, 2005 (JP) ............................. 2005-051162

(51) Int. Cl.
*C08K 3/36* (2006.01)
(52) U.S. Cl. ...................... 525/403; 428/448
(58) Field of Classification Search ............... 428/448; 525/403
See application file for complete search history.

(56) References Cited

U.S. PATENT DOCUMENTS

| | | | | |
|---|---|---|---|---|
| 4,965,333 | A * | 10/1990 | Inouye et al. | 528/33 |
| 5,352,724 | A * | 10/1994 | Fujiki et al. | 524/398 |
| 5,378,734 | A * | 1/1995 | Inoue | 522/11 |
| 5,656,771 | A | 8/1997 | Beswick et al. | |
| 5,736,998 | A * | 4/1998 | Caren et al. | 347/45 |
| 5,880,211 | A * | 3/1999 | Miyake et al. | 524/773 |
| 6,287,685 | B1 * | 9/2001 | Janssen et al. | 428/353 |
| 6,517,946 | B2 | 2/2003 | Shiono et al. | |
| 6,576,737 | B2 | 6/2003 | Shiono et al. | |
| 6,734,250 | B2 * | 5/2004 | Azechi et al. | 524/588 |
| 6,784,241 | B2 * | 8/2004 | Sakamoto et al. | 524/588 |
| 6,811,650 | B2 | 11/2004 | Takuman et al. | |
| 6,835,331 | B2 * | 12/2004 | Fujiki et al. | 252/512 |
| 6,878,769 | B2 | 4/2005 | Sakamoto et al. | |
| 6,949,294 | B2 | 9/2005 | Kashiwagi et al. | |
| 2002/0132902 | A1 | 9/2002 | Shiono | |

FOREIGN PATENT DOCUMENTS

| | | |
|---|---|---|
| EP | 1 081 185 A1 | 3/2001 |
| EP | 1 122 284 A1 | 8/2001 |
| EP | 1 233 194 A1 | 7/2002 |
| EP | 1 413 588 A1 | 4/2004 |
| EP | 1 486 534 A1 | 12/2004 |
| JP | 9-95615 A | 4/1997 |
| JP | 2001-220509 A | 8/2001 |
| JP | 2002-105319 A | 4/2002 |
| JP | 2002-285130 A | 10/2002 |
| JP | 2003-238809 A | 8/2003 |

* cited by examiner

*Primary Examiner*—Kuo-Liang Peng
*Assistant Examiner*—Robert Loewe
(74) *Attorney, Agent, or Firm*—Birch Stewart Kolasch & Birch, LLP

(57) ABSTRACT

An adhesive composition comprising the following components:
(A) a linear polyfluoro compound having at least two SiH bonds per molecule and a perfluoropolyether residue in a main chain of the linear polyfluoro compound (A);
(B) an organohydrogensiloxane having a fluorinated group and at least two hydrogen atoms each bonded to a silicon atom per molecule;
(C) a compound of a platinum group metal;
(D) hydrophobic silica powder;
(E) an alkoxysilane represented by the following formula (1)

$$(RO)_3-Si-T \qquad (1)$$

wherein R is a monovalent hydrocarbon group,
T is a group represented by the formula, $-OR^1$ or $-CHR^2-COOR^3$, wherein $R^1$ is a monovalent hydrocarbon group, which may be the same with or different from R, $R^2$ is a hydrogen atom or a methyl group and $R^3$ is a monovalent hydrocarbon group; and
(F) an organosiloxane having at least one SiH bond and at least one group selected from the group consisting of an epoxy group and a trialkoxysilyl group. The composition has no quality variation from lot to lot and gives a cured product having good resistance to solvents and heat, and durability.

9 Claims, No Drawings

FLUOROPOLYETHER ADHESIVE COMPOSITION

CROSS REFERENCES

This application is a divisional of application Ser. No. 11/070,160, filed Mar. 3, 2005 now abandoned. This application claims the benefit under 35 U.S.C. §120 of application Ser. No. 11/070,160. This application claim the benefit under 35 U.S.C. §119 of Japanese Patent Applications No. 2004-063206 filed on Mar. 5, 2004, and No. 2005-51162 filed on Feb. 25, 2005. The contents of the foregoing applications are hereby incorporated by reference.

FIELD OF THE INVENTION

The present invention relates to an adhesive composition which is self-adhesive to various kinds of substrates such as metals and plastics. The composition, when cured, gives a fluorinated elastomer which adheres strongly to a substrate with excellent long-term durability.

DESCRIPTION OF THE PRIOR ART

A curable composition is known which forms a fluorinated elastomer by addition reaction between alkenyl groups and hydrosilyl groups contained in the composition. Japanese Laid-Open Patent Application No. 9-95615 discloses a composition which comprises, in addition to the aforesaid curable composition, an organopolysiloxane having hydrosilyl groups and epoxy groups and/or trialkoxysilyl groups to thereby have a self-adherence property. Japanese Laid-Open Patent Application No. 2001-220509 discloses a composition which further comprises silica powder surface-treated with a fluorinated organosilane or a fluorinated organosiloxane to thereby improve durability of a cured product thereof.

These compositions can be cured in a short period of time to give cured products having resistance to solvents, chemicals and heat, good low temperature property, low moisture permeability, and good electrical properties. For this reason, the compositions are used as adhesives in various industries where the above properties are required, particularly in the automobile industry, for sealing or coating of electric and electronic automobile parts.

However, the adhesive composition comprising the silica powder has a drawback. That is, adhesion strength and durability of a cured product therefrom vary depending on the amount of moisture adsorbed on the silica powder. Further, the higher the adsorbed moisture content is, the lower the adhesion strength and durability tend to be. This variation in properties is detrimental in the automobile industry where quality stability of automobile parts is crucial. Therefore, an adhesive composition is desired which shows no quality variation from lot to lot and gives an adhesive layer having long-term reliability.

SUMMARY OF THE INVENTION

A purpose of the present invention is to provide an adhesive composition which has no quality variation from lot to lot; can be cured by heating for a short period of time to adhere strongly to substrates of various kinds of materials such as metals and plastics; and gives a cured product having good resistance to solvents and heat, low moisture permeability and durability.

The inventor has found that the above purpose is attained by incorporating specific alkoxysilane in an adhesive composition Thus, the present invention is an adhesive composition comprising the following components:

100 parts by weight of (A) a linear polyfluoro compound having at least two alkenyl groups per molecule and a perfluoropolyether residue in a main chain of the linear polyfluoro compound (A);

(B) an organohydrogensiloxane having a fluorinated group and at least two SiH bonds per molecule in such an amount that a molar amount of the SiH bond is 0.5 to 3.0 times that of the alkenyl group contained in the component (A);

(C) 0.1 to 500 ppm of a compound of a platinum group metal in an amount of, calculated as platinum group metal, based on 100 parts by weight of the component (A);

0.5 to 30 parts by weight of (D) hydrophobic silica powder;

0.5 to 15 parts by weight, per 100 parts by weight of the component (D), of (E) an alkoxysilane represented by the following formula (1)

$$(RO)_3\text{—Si-T} \quad (1)$$

wherein R may be the same with or different from each other and is a monovalent hydrocarbon group, T is a group represented by the formula, —OR$^1$ or —CHR$^2$—COOR$^3$, wherein R$^1$ is a monovalent hydrocarbon group, which may be the same with or different from R, R$^2$ is a hydrogen atom or a methyl group and R$^3$ is a monovalent hydrocarbon group; and 0.1 to 10 parts by weight of (F) an organosiloxane having at least one SiH bond and at least one group selected from the group consisting of an epoxy group and a trialkoxysilyl group, said at least one group being bonded to a silicon atom of the organosiloxane (F) via an organic group which may contain an oxygen atom.

The present composition comprises the specific alkoxysilane of the formula (1) above to thereby be free from the aforesaid problem caused by moisture adsorbed on silica powder. The composition adheres well to various kinds of materials such as metals and plastics. An adhesive layer formed by heating the composition at a relatively low temperature for a short period of time has excellent resistance to solvents, heat, low moisture permeability and durability. The composition is useful for sealing and coating electric or electrical parts in the industries where stable quality and long-term reliability are required.

PREFERRED EMBODIMENTS OF THE INVENTION

Each component of the present adhesive composition will be explained below.

(A) Linear Polyfluoro Compound

The linear polyfluoro compound (A) has at least two alkenyl groups per molecule. Preferably, the linear polyfluoro compound (A) is represented by the following formula (2), $$CH_2\!=\!CH\!-\!(X)_a\!-\!R_f^1\!-\!(X')_a\!-\!CH\!=\!CH_2 \quad (2)$$

wherein X is —CH$_2$—, —CH$_2$O—, —CH$_2$OCH$_2$—, or —Y—NR'—CO—, wherein Y is —CH$_2$— or an o-, m-, or p-dimethylsilylphenylene group represented by the following formula (Z)

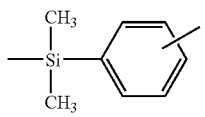
(Z)

and R' is a hydrogen atom or a monovalent hydrocarbon group of which hydrogen atom may be replaced with a halogen atom, X' is —CH$_2$—, —OCH$_2$—, —CH$_2$OCH$_2$—, or —CO—NR'—Y'—, wherein Y' is —CH$_2$— or an o-, m-, or p-dimethylsilylphenylene group represented by the following formula (Z')

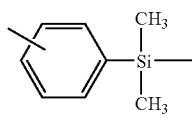
(Z')

and R' is a hydrogen atom or a monovalent hydrocarbon group of which hydrogen atom may be replaced with a halogen atom, "a" is an integer of 0 or 1 and may be the same with or different from each other; and $R_f^1$ is a divalent perfluoropolyether group.

Examples of R', besides a hydrogen atom, include monovalent hydrocarbon groups having 1 to 12 carbon atoms, preferably 1 to 10 atoms, for example, alkyl groups such as methyl, ethyl, propyl, butyl, hexyl, cyclohexyl, and octyl groups; aryl groups such as phenyl group and tolyl groups; aralkyl groups such as benzyl group and phenylethyl groups; and halogenated groups thereof wherein a part of or all of the hydrogen atoms are replaced with a halogen atom such as a fluorine atom. Among these, a methyl group and a phenyl group are preferred.

In the formula (2), $R_f^1$ is a divalent perfluoropolyether group, preferably the one represented by the following formula (i) or (ii):

—C$_t$F$_{2t}$[OCF$_2$CF(CF$_3$)]$_b$O(CF$_2$)$_L$O[CF(CF$_3$)CF$_2$O]$_c$C$_t$F$_{2t}$— (i)

wherein b and c are integers of from 0 to 200 with an average of a sum, b+c, ranging from 2 to 200, L is an integer of from 2 to 6 and t is an integer of 2 or 3, —C$_t$F$_{2t}$[OCF$_2$CF(CF$_3$)]$_u$(OCF$_2$)$_v$OC$_t$F$_{2t}$— (ii)

wherein u is an integer of from 1 to 200, v is an integer of from 1 to 50, with an average of a sum, u+v, ranging from 2 to 200, and t is an integer of 2 or 3.

Preferred examples of $R_f^1$ are represented by the following formulae, among which the first one is especially preferred.

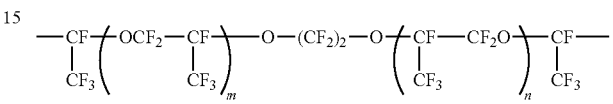

wherein m and n are integers of 1 or larger with an average of a sum, m+n, ranging from 2 to 200;

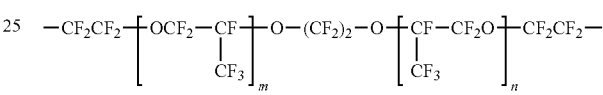

wherein m and n are integers of 1 or larger with an average of a sum, m+n, ranging from 2 to 200; and

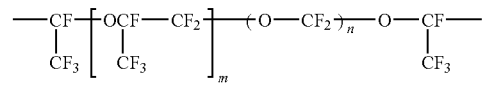

wherein m is an integer of from 1 to 200 and n is an integer of from 1 to 50.

Preferably, the linear polyfluoro compound (A) is represented by the following formula (3).

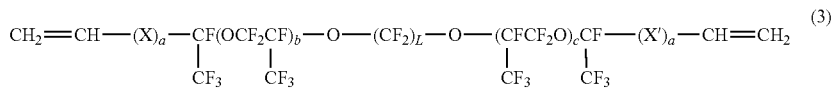
(3)

wherein X and X' are as already explained above, "a" may be the same with or different from each other and is an integer of 0 or 1, L is an integer of from 2 to 6, and b and c are both integers of from 1 to 150 with an average of a sum, b+c, ranging from 2 to 200.

Examples of the linear polyfluoro compound of the formula (3) are as shown below.

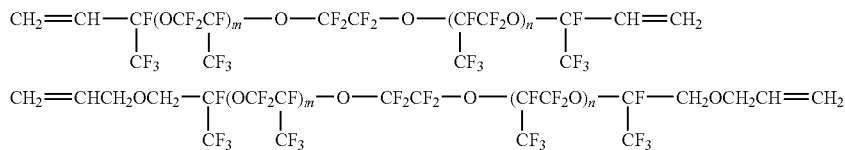

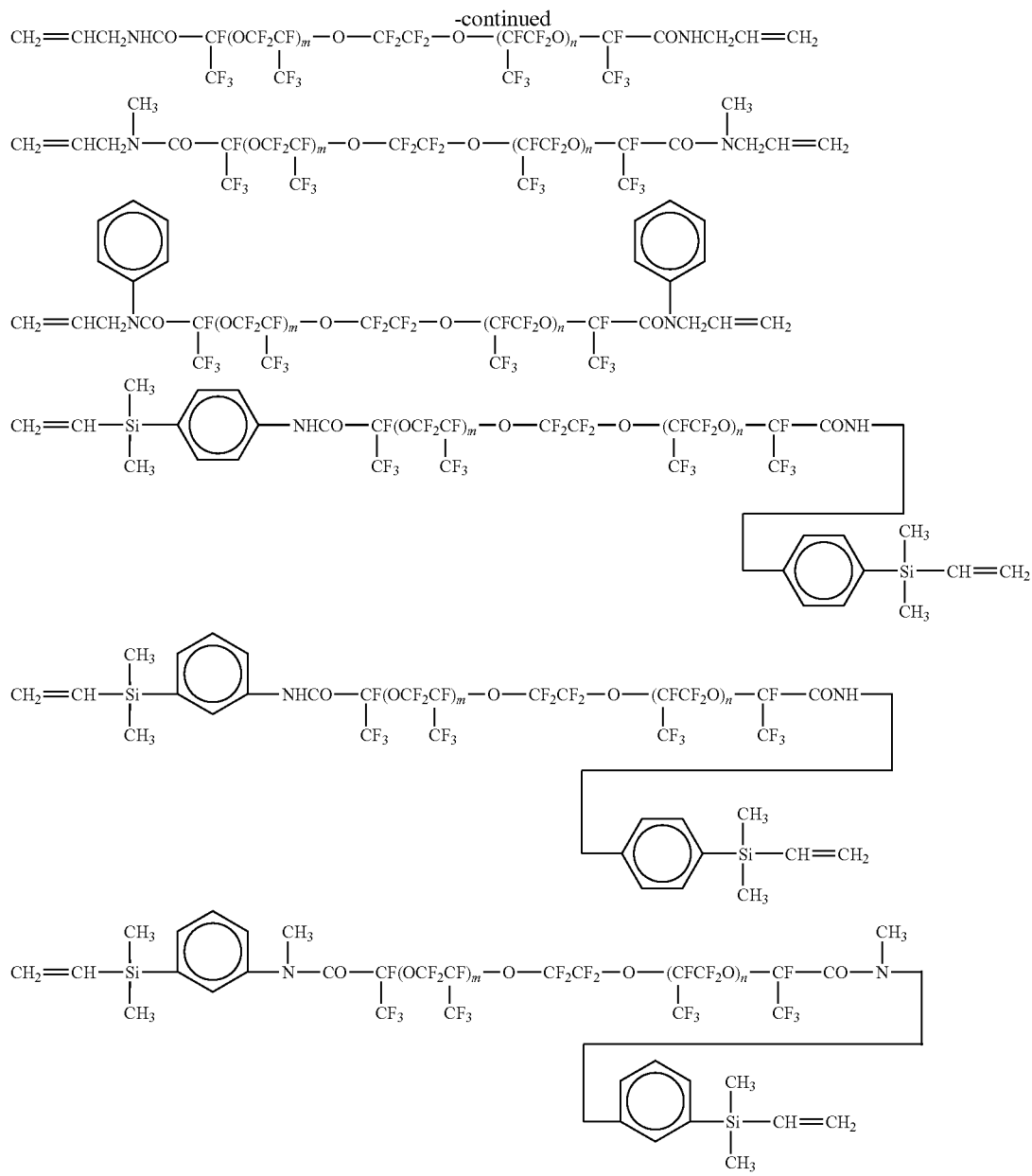

In the above formulae, m and n are integers of from 1 to 200 with m+n ranging from 6 to 200.

Preferably, the linear polyfluoro compound (A) has a viscosity of from 100 to 100,000 mPa·s, more preferably from 500 to 50,000 mPa·s, and most preferably from 1,000 to 20,000 mPa·s at 23 degrees C. The viscosity in the above range is particularly preferred for sealing, potting, coating, and impregnation applications, because of excellent physical properties both at a time of applying the composition and a time after curing. The above linear polyfluoro compounds may be used alone or in a mixture of two or more of them.

(B) Organohydrogensiloxane

The organohydrogensiloxane (B) has at least two SiH bonds per molecule and a fluorinated group. The organohydrogensiloxane (B) functions as a crosslinking agent or a chain extender for the linear polyfluoro compound (A). Preferably, the organohydrogensiloxane (B) has at least one fluorinated group selected from the group consisting of perfluoroalkyl groups, perfluoroxyalkyl groups, perfluoroalkylene groups and perfluoroxyalkylene groups from the viewpoint of good miscibility with the linear polyfluoro compound (A), uniform properties of the composition and, accordingly, of a cured product.

Examples of such fluorinated groups are represented by the following formulae.

$C_gF_{2g+1}-$ wherein g is an integer of from 1 to 20, preferably from 2 to 10;

$-C_gF_{2g}-$ wherein g is an integer of from 1 to 20, preferably from 2 to 10;

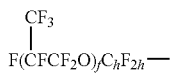

wherein f is an integer of from 2 to 200, preferably from 2 to 100, and h is an integer of from 1 to 3;

wherein i and j are integers of at least 1 with an average of a sum, i+j, ranging from 2 to 200, preferably from 2 to 100; and
—$(CF_2O)_e$—$(CF_2CF_2O)_l$—$CF_2$— wherein e and l are integers of from 1 to 50.

The perfluoroalkyl group, perfluoroxyalkyl group, perfluoroalkylene group, or perfluoroxyalkylene group may be bonded to a silicon atom via a divalent group such as an alkylene group, an arylene group and a combination thereof, which divalent group may have an ether, an amide, or a carbonyl group. Examples of the divalent group include those having 2 to 12 carbons such as —$H_2CH_2$—, —$CH_2CH_2CH_2$—, —$CH_2CH_2CH_2OCH_2$—, —$CH_2CH_2CH_2$—NH—CO—, —$CH_2CH_2CH_2$—N($CH_3$)—CO—, —$CH_2CH_2CH_2$—O—CO—, and —$CH_2CH_2CH_2$—N(Ph)—CO— wherein "Ph" represents a phenyl group.

Examples of the organohydrogensiloxane (B) having aforesaid fluorinated group include the compounds represented by the following formulae, which may be used alone or in a mixture of two or more of them. In the formulae below, "Me" represents a methyl group and "Ph" represents a phenyl group.

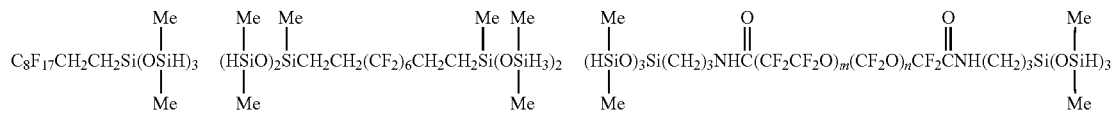

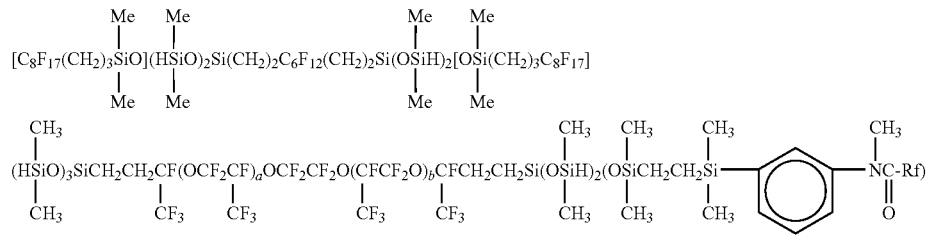

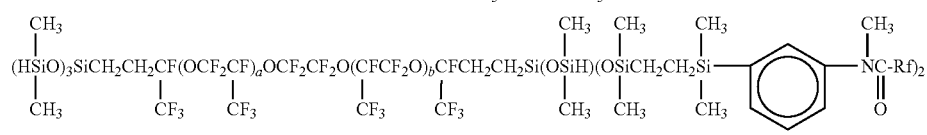

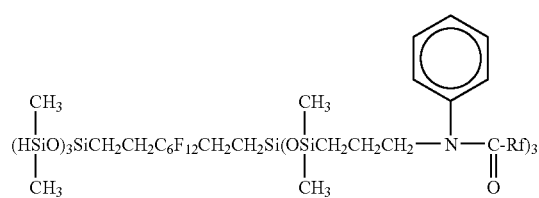

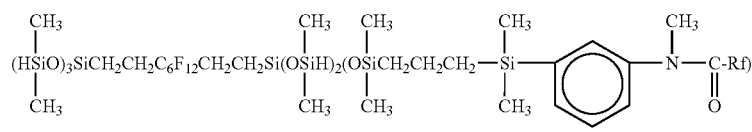

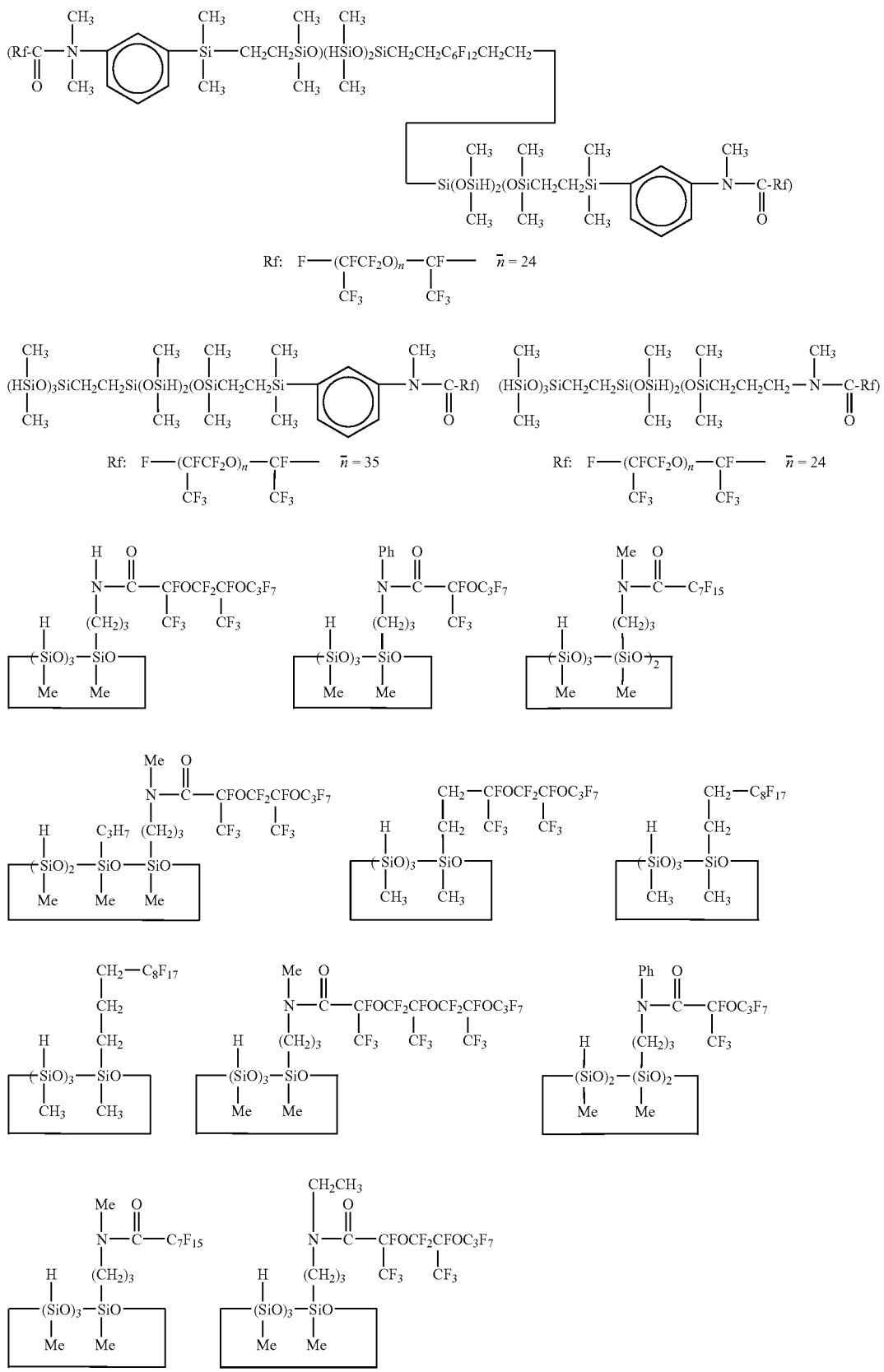

-continued
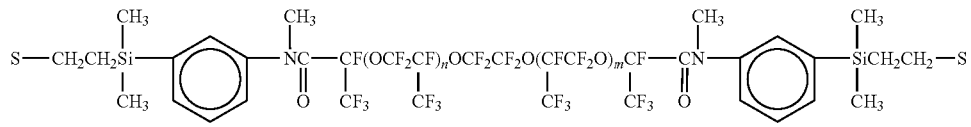
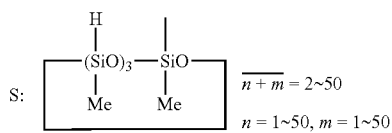
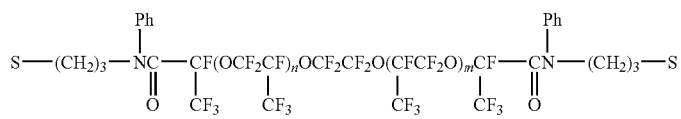
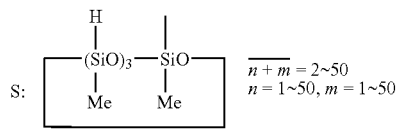
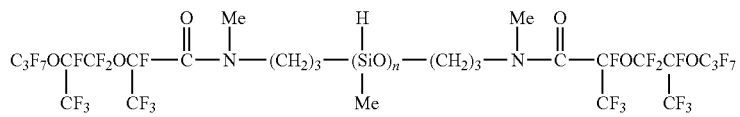
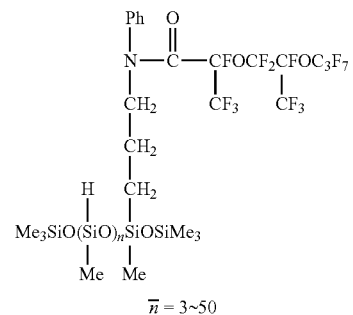
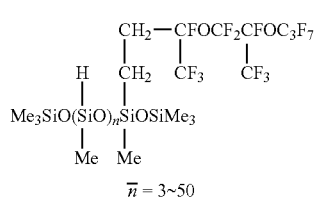
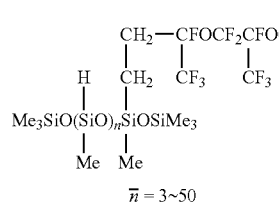
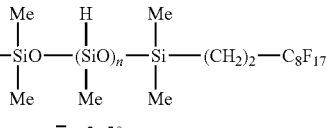
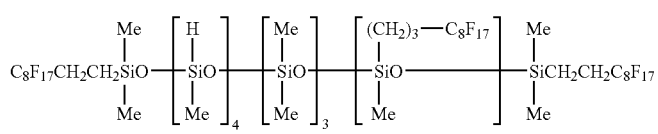
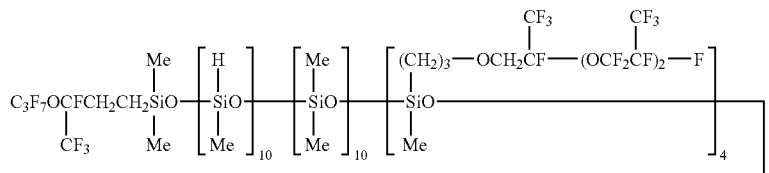
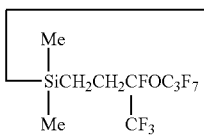

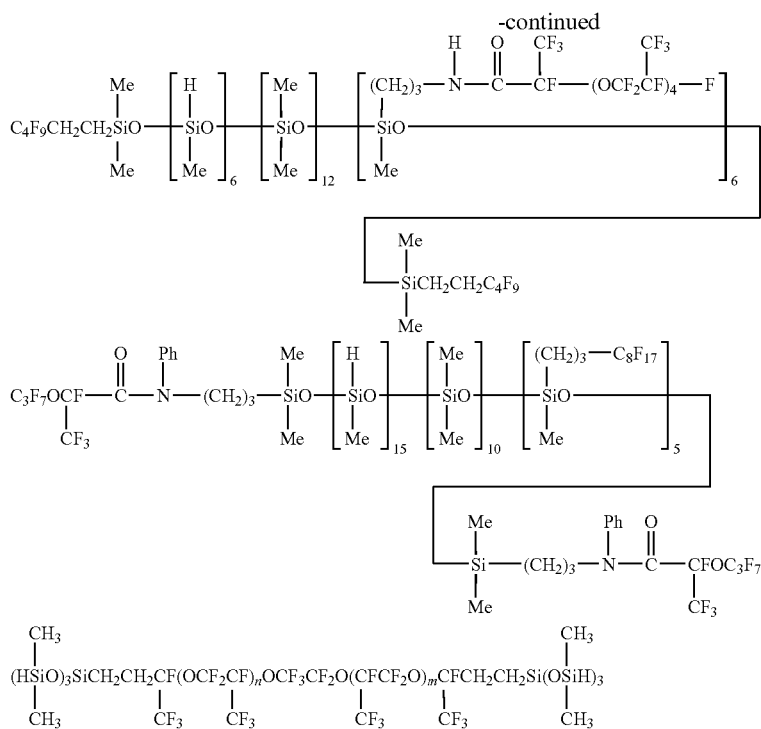

In the above formulae, n and m are integers of from 1 to 50 with a sum, n+m, ranging from 2 to 50.

The organohydrogensiloxane (B) is incorporated in the composition in an amount enough to form a cured product through a reaction with the linear polyfluoro-compound (A). Typically, the organohydrogensiloxane (B) is incorporated in such an amount that a molar amount of the SiH bond therein is 0.5 to 3.0 times, preferably 0.8 to 2.0 times, that of the alkenyl group such as a vinyl, an allyl, or a cycloalkenyl group present in the component (A). With a less amount of SiH bond than the aforesaid lower limit, a cured product may not be obtained which has a sufficient degree of crosslinking and thus sufficient hardness. On the other hand, a larger amount of SiH bond than the aforesaid upper limit may cause foaming during curing process.

(C) Compound of a Platinum Group Metal

The compound of a platinum group metal (C) is a hydrosilylation catalyst. The hydrosilylation catalyst promotes an addition reaction between the alkenyl groups in the component (A) and the SiH bonds in the component (B). Generally, the hydrosilylation catalyst is a compound of a noble metal. Platinum or a platinum compound is widely used because they are readily available.

Examples of the platinum compound include hydrogen chloroplatinic acid, a complex of hydrogen chloroplatinic acid with an olefin such as ethylene, an alcohol, or a vinylsiloxane, metallic platinum supported on silica, alumina or carbon. Compounds of other platinum group metal than platinum may be used, for example, compounds of rhodium, ruthenium, iridium, and palladium, such as RhCl(PPh$_3$)$_3$, RhCl(CO)(PPh$_3$)$_2$, Ru$_3$(CO)$_{12}$, IrCl(CO)(PPh$_3$)$_2$, and Pd(PPh$_3$)$_4$, wherein "Ph" represents a phenyl group.

The compound of a platinum group metal (C) may be used in a solid form, but preferably used in a solution, for example, a solution of chloroplatinic acid or the chloroplatinic acid complex with an olefin such as an ethylene in an appropriated solvent in the viewpoint of good miscibility with the linear polyfluoro compound (A).

The component (C) is used in a catalytic amount, typically ranging 0.1 to 500 ppm, calculated as platinum group metal, based on 100 parts by weight of the component (A).

(D) Hydrophobic Silica Powder

The hydrophobic silica powder (D) provides physical strength in a cured product and makes (F) the organosiloxane dispersed uniformly in the composition. The hydrophobic silica powder (D) may be prepared by treating silica fine powder which is known as a filler in silicone rubber and has a BET specific surface area of at least 50 m$^2$/g, particularly from 50 to 400 m$^2$/g, with a surface treatment agent which will be explained below.

With silica powder having a BET specific surface area smaller than the aforesaid lower limit, physical strength of a cured product may be too low, and the component (F) may not be dispersed uniformly in the composition. Silica powder having a BET specific surface area exceeding the aforesaid upper limit may be difficult to be dispersed uniformly in a composition. Examples of the silica powder (D) include fumed silica, precipitated silica and colloidal silica, among which fumed silica is most preferred.

The aforesaid silica fine powder may be surface treated with an agent for hydrophobicity selected from the group consisting of organochlorosilanes, organodisilazanes, cyclic organopolysilazanes, and linear organopolysiloxane, among which organochlorosilanes, organodisilazanes and cyclic organopolysilazanes are preferred.

The hydrophobic silica powder (D) may be incorporated in the composition in an amount of from 0.5 to 30 parts by weight, preferably 1.0 to 25 parts by weight, per 100 parts by weight of the component (A). A composition comprising the silica in an amount less than the aforesaid lower limit may not adhere well or give a cured product with unsatisfactory adhesion strength. On the other hand, a composition comprising the silica in an amount exceeding the aforesaid upper limit may not flow properly and also give a cured product with unsatisfactory adhesion strength.

(E) Alkoxysilane

In the present composition, the alkoxysilane (E) is represented by the following formula (1)

$$(RO)_3\text{—Si-T} \quad (1)$$

wherein R may be the same with or different from each other and is a monovalent hydrocarbon group, T is a group represented by the formula, $-OR^1$ or $-CHR^2-COOR^3$, wherein $R^1$ may be the same with or different from R and is a monovalent hydrocarbon group, $R^2$ is a hydrogen atom or a methyl group, and $R^3$ is a monovalent hydrocarbon group.

In the formula (1), preferred examples of R include monovalent hydrocarbon groups having 1 to 8, preferably 1 to 4, carbon atoms and preferably having no aliphatic unsaturated bond, for example, alkyl groups such as methyl, ethyl, propyl, isopropyl, butyl, isobutyl, tert-butyl, pentyl, hexyl, and octyl groups; cycloalkyl groups such as cyclopentyl, cyclohexyl, and cycloheptyl groups; aryl groups such as phenyl, tolyl, and xylyl groups; and aralkyl groups such as benzyl, and phenylethyl groups. Among these, a methyl, an ethyl, a propyl, an isopropyl, a butyl, an isobutyl, and a tert-butyl groups are preferred.

In the formula (1), T is a group represented by the formula, $-OR^1$ or $-CHR^2-COOR^3$. In the group, $-OR^1$, $R^1$ is a monovalent hydrocarbon group which may be the same with or different from the aforesaid R.

In the group, $-CHR^2-COOR^3$, $R^2$ is a hydrogen atom or a methyl group and $R^3$ is a monovalent hydrocarbon group having 1 to 8, preferably 1 to 4, carbon atoms which preferably has no aliphatic unsaturated bond. Examples of $R^3$ include alkyl groups such as methyl, ethyl, propyl, isopropyl, butyl, isobutyl, tert-butyl, pentyl, hexyl, and octyl groups; cycloalkyl groups such as cyclopentyl, cyclohexyl, and cycloheptyl groups; aryl groups such as phenyl, tolyl, and xylyl groups; and aralkyl groups such as benzyl, and phenylethyl groups. Among these, alkyl groups such as methyl, ethyl, propyl, isopropyl, butyl, isobutyl, and tert-butyl groups are preferred.

The alkoxysilane of the formula (1) can be prepared by a method known to the silicone industry. For example, it can be prepared by subjecting tetrahalogenosilane to a reaction with an alcohol, $R^1OH$, in the presence of a dehydrohalogenation agent.

Examples of the alkoxysilane are represented by the following formulae. These alkoxysilane may be used alone or in a combination of two or more of them.

(CH$_3$O)$_4$Si
(C$_2$H$_5$O)$_4$Si
(C$_2$H$_5$O)$_3$SiOCH$_3$
(n-C$_3$H$_7$O)$_4$Si
(n-C$_3$H$_7$O)$_3$SiOCH$_3$
(n-C$_3$H$_7$O)$_3$SiOC$_2$H$_5$
(i-C$_3$H$_7$O)$_4$Si
(i-C$_3$H$_7$O)$_3$SiOCH$_3$
(i-C$_3$H$_7$O)$_3$SiOC$_2$H$_5$
(n-C$_4$H$_9$O)$_3$SiOCH$_3$
(n-C$_4$H$_9$O)$_3$SiOC$_2$H$_5$
(i-C$_4$H$_9$O)$_3$SiOCH$_3$
(i-C$_4$H$_9$O)$_3$SiOC$_2$H$_5$
(t-C$_4$H$_9$O)$_3$SiOCH$_3$
(t-C$_4$H$_9$O)$_3$SiOC$_2$H$_5$

The alkoxysilane of the formula $(RO)_3-Si-CHR^2-COOR^3$ may be prepared by different methods depending on the type of $R^2$. The one with $R^2$ being a hydrogen atom may be prepared by subjecting a tetraalkoxysilane of the following formula (4) to a reaction with bromoacetate of the following formula (5) in the presence of zing powders.

$$(RO)_4\text{—Si} \quad (4)$$

wherein R is as defined above, $$BrCH_2\text{—}COOR^3 \quad (5)$$

wherein $R^3$ is as defined above,

Examples of the alkoxysilane are represented by the following formulae. These may be used alone or in a mixture of two or more of them.

(CH$_3$O)$_3$SiCH$_2$COOCH$_3$
(CH$_3$O)$_3$SiCH$_2$COOC$_2$H$_5$
(CH$_3$O)$_3$SiCH$_2$COOC$_3$H$_7$-n
(CH$_3$O)$_3$SiCH$_2$COOC$_3$H$_7$-i
(CH$_3$O)$_3$SiCH$_2$COOC$_4$H$_9$-n
(CH$_3$O)$_3$SiCH$_2$COOC$_4$H$_9$-i
(CH$_3$O)$_3$SiCH$_2$COOC$_4$H$_9$-t
(CH$_3$O)$_3$SiCH$_2$COOC$_8$H$_{17}$-n
(C$_2$H$_5$O)$_3$SiCH$_2$COOCH$_3$
(C$_2$H$_5$O)$_3$SiCH$_2$COOC$_2$H$_5$
(C$_2$H$_5$O)$_3$SiCH$_2$COOC$_3$H$_7$-n
(C$_2$H$_5$O)$_3$SiCH$_2$COOC$_3$H$_7$-i
(C$_2$H$_5$O)$_3$SiCH$_2$COOC$_4$H$_9$-n
(C$_2$H$_5$O)$_3$SiCH$_2$COOC$_4$H$_9$-i
(C$_2$H$_5$O)$_3$SiCH$_2$COOC$_4$H$_9$-t

The alkoxysilane with $R^2$ being a methyl group may be prepared by subjecting an organohydrogensiloxne of the following formula (6) to a reaction with an acrylate of the formula (7) in the presence of a platinum catalyst.

$$(RO)_3\text{—Si}\text{—}H \quad (6)$$

wherein R is as defined above;

$$CH_2\text{=}CH\text{—}COOR^3 \quad (7)$$

wherein $R^3$ is as defined above;

Preferably, the alkoxysilane obtained is isolated and purified by, for instance, distillation, after the reaction.

Examples of the alkoxysilane are represented by the following formulae. These may be used alone or in a mixture of two or more of them.

(CH$_3$O)$_3$SiCH(CH$_3$)COOCH$_3$
(CH$_3$O)$_3$SiCH(CH$_3$)COOC$_2$H$_5$
(CH$_3$O)$_3$SiCH(CH$_3$)COOC$_3$H$_7$-n
(CH$_3$O)$_3$SiCH(CH$_3$)COOC$_3$H$_7$-i
(CH$_3$O)$_3$SiCH(CH$_3$)COOC$_4$H$_9$-n
(CH$_3$O)$_3$SiCH(CH$_3$)COOC$_4$H$_9$-i
(CH$_3$O)$_3$SiCH(CH$_3$)COOC$_4$H$_9$-t
(CH$_3$O)$_3$SiCH(CH$_3$)COOC$_8$H$_{17}$-n
(C$_2$H$_5$O)$_3$SiCH(CH$_3$)COOCH$_3$
(C$_2$H$_5$O)$_3$SiCH(CH$_3$)COOC$_2$H$_5$
(C$_2$H$_5$O)$_3$SiCH(CH$_3$)COOC$_3$H$_7$-n
(C$_2$H$_5$O)$_3$SiCH(CH$_3$)COOC$_3$H$_7$-i
(C$_2$H$_5$O)$_3$SiCH(CH$_3$)COOC$_4$H$_9$-n
(C$_2$H$_5$O)$_3$SiCH(CH$_3$)COOC$_4$H$_9$-i
(C$_2$H$_5$O)$_3$SiCH(CH$_3$)COOC$_4$H$_9$-t

The component (E) may be incorporated in the composition in an amount of 0.5 to 15 parts by weight, preferably 1 to 10 parts by weight, per 100 parts by weight of the component (D). With a less amount of the component (E) than the aforesaid lower limit, the effect on the component (D) may not be sufficient to achieve the present purpose. A composition comprising a larger amount of the component (E) than the aforesaid upper limit may not be cured properly, so that physical strength of a cured product therefrom may be too low.

The alkoxysilane (E) is mixed with the linear polyfluoro compound (A) and the hydrophobic silica powder (D) in a mixing apparatus such as a planetary mixer, a gate mixer and a kneader. By mixing these three components all together, moisture adsorbed on a surface of the hydrophobic silica powder (D) may be removed; a surface of the hydrophobic silica powder (D) may be alkoxysilylated; and adsorption of the linear polyfluoro compound (A) on the surface of the hydrophobic silica powder (D) is promoted to prevent adsorption of the component (F) on the surface of the hydrophobic silica powder (D). Consequently, a flow property of the composition, adhesion property in a curing process and durability of a cured product therefrom are improved.

Preferred alkoxysilane (E) are as shown below. They are easy to prepare and their by-products are volatile and thus easy to remove.

$(CH_3O)_4Si$
$(C_2H_5O)_4Si$
$(CH_3O)_3SiCH_2COOCH_3$
$(CH_3O)_3SiCH_2COOC_2H_5$
$(CH_3O)_3SiCH_2COOCH_3$
$(CH_3O)_3SiCH_2COOC_2H_5$
$(CH_3O)_3SiCH(CH_3)COOCH_3$
$(CH_3O)_3SiCH(CH_3)COOC_2H_5$
$(C_2H_5O)_3SiCH(CH_3)COOCH_3$
$(C_2H_5O)_3SiCH(CH_3)COOC_2H_5$ (F) Organosiloxane The organosiloxane (F) makes the present composition self-adhesive, i.e., adhering to a various kinds of substrates without a primer. The organosiloxane (F) has a SiH bond and at least one group selected from the group consisting of an epoxy and trialkoxysilyl groups, which at least one group is bonded to a silicon atom of the organosiloxane (F) via an organic group which may contain an oxygen atom. Preferably, it further has at least one perfloroalkyl group or perfloroxyalkyl group bonded to a silicon atom of said organosiloxane via an organic group which may contain an oxygen atom.

The organosiloxane (F) may be linear, cyclic or branched. Examples of the organosiloxane (F) are as shown below.

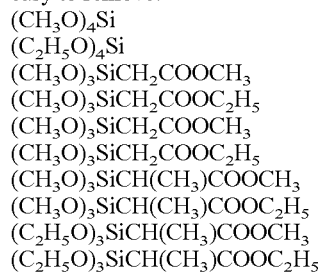

wherein $R^4$ is a monovalent hydrocarbon group which may be halogenated, A and B will be explained below, and x, y, z and w are numbers with $0 \leq w \leq 100$, $1 \leq x \leq 100$, $1 \leq y \leq 100$, and $0 \leq z \leq 100$ and.

Preferred examples of $R^4$ include monovalent hydrocarbon groups, having 1 to 10, particularly 1 to 8, carbon atoms, for example, alkyl groups such as methyl, ethyl, propyl, butyl, hexyl, cyclohexyl, and octyl groups; aryl groups such as phenyl, and tolyl groups; aralkyl groups such as benzyl and phenylethyl groups; and partly or fully halogenated groups thereof, among which a methyl group is particularly preferred.

Preferably, x, y, z and w are numbers with $1 \leq x \leq 20$, $1 \leq y \leq 20$, $1 \leq z \leq 20$, $0 \leq w \leq 20$ with $3 \leq w+x+y+z \leq 50$.

The group, A, is an epoxy or trialkoxysilyl group which is bonded to a silicon atom of the organosiloxane (F) via an organic group which may contain an oxygen atom. Examples are represented by the following formulae.

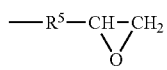

wherein $R^5$ represents a divalent hydrocarbon group having 1 to 10, particularly 1 to 5, carbon atoms, which may have an oxygen atom, for example, an alkylene group such as a propylene, a butylene, a pentylene, a hexylene, a propyleneoxymethylene, and a butyleneoxymethylene group and a cycloalkylene group;

wherein $R^6$ represents a divalent hydrocarbon group having 1 to 10, particularly 1 to 4, carbon atoms, for example, an alkylene group such as an ethylene, propylene and butylene group; and $R^7$ represents a monovalent hydrocarbon group having 1 to 8, particularly 1 to 4, carbon atoms, for example, an alkyl group such as a methyl, ethyl, propyl, isobutyl and tert-butyl group; and

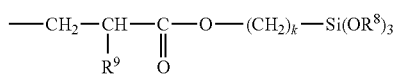

wherein $R^8$ represents a monovalent hydrocarbon group having 1 to 8, particularly 1 to 4, carbon atoms, for example, an alkyl group such as a methyl, ethyl, propyl, isopropyl, butyl, isobutyl and tert-butyl group; $R^9$ represents a hydrogen atom or a methyl group; and k is an integer of from 2 to 10.

The group, B, is a perfluoroalkyl group or a perfluoroxyalkyl group bonded to a silicon atom of the component (F) via an organic group which may have an oxygen atom. Examples of B are represented by the following formulae

wherein g is an integer as defined above; and

wherein f and h are as defined above.

The organosiloxane (F) may be prepared by subjecting an organohydrogenpolysiloxane having at least three SiH bonds per molecule to an addition reaction with a compound having both an aliphatic unsaturated group such as a vinyl group or an allyl group, and an epoxy group and/or a trialkokysilyl group and, optionally, a compound having both an aliphatic unsaturated group and a perfluoroalkyl group or perfluorooxyalkyl group, according to a conventional manner. It should be noted that the number of the aliphatic unsaturated group should be smaller than that of the SiH bonds and therefore a part of the SiH bonds remain unreacted.

After the reaction, the organosiloxane (F) is isolated. However, removal of unreacted reactants and a catalyst used may be enough to be incorporated in the present composition.

Examples of the component (F) are as shown below, wherein Me represents a methyl group. These may be used alone or in a mixture of two or more of them.

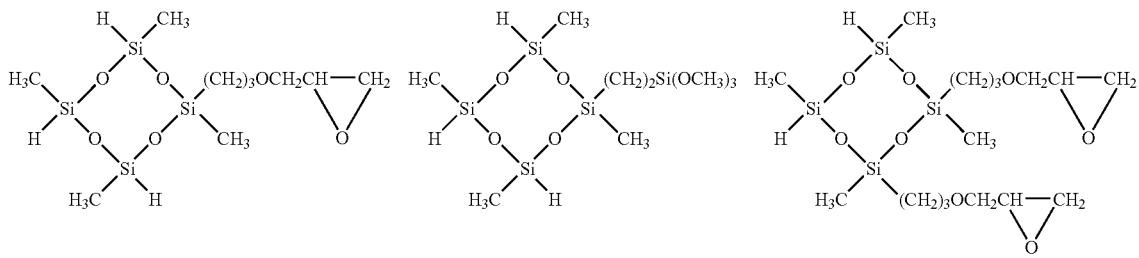
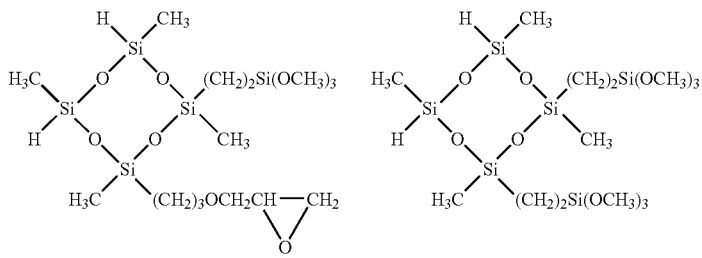
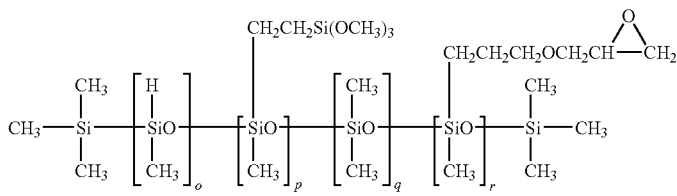
wherein o, q, and r are positive numbers, and p is an integer of at least 0;
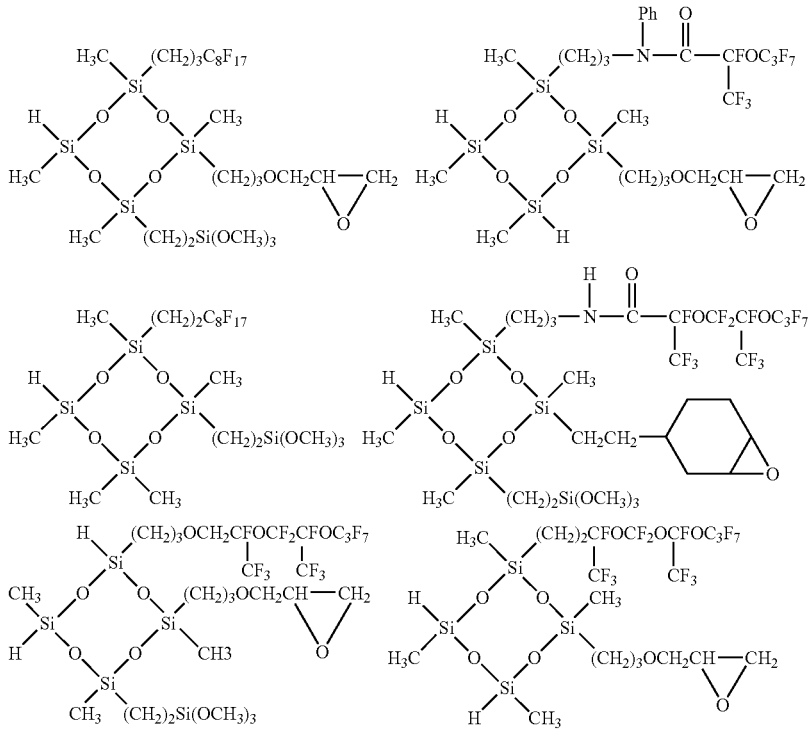

-continued

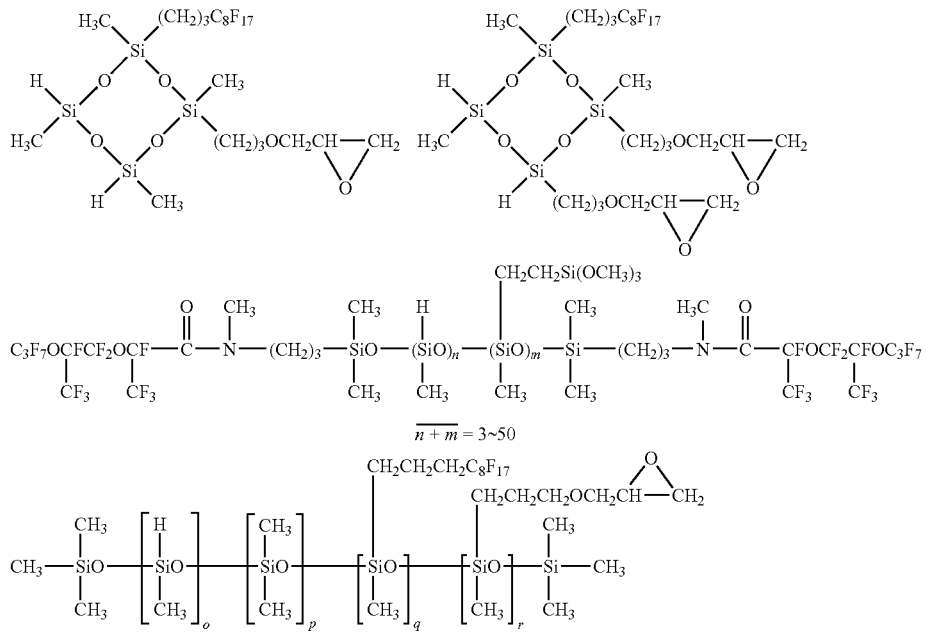

wherein o, q, and r are positive numbers, and p is an integer of at least 0.

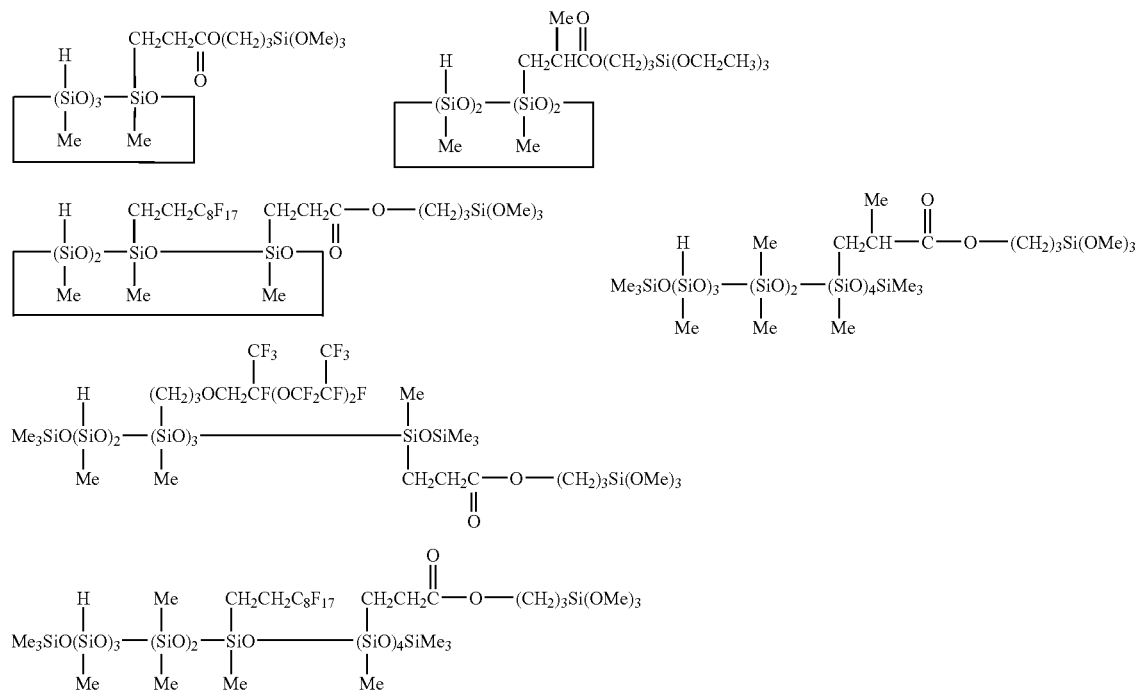

The component (F) may be incorporated in the composition in an amount of from 0.1 to 10, preferably 0.2 to 5, parts by weight per 100 parts by weight of the component (A). With the component (F) less than the aforesaid lower limit, satisfactory adhesion strength is not be attained. A composition comprising the component (F) in an amount more than the aforesaid upper limit may not flow properly and the curing reaction is so prohibited that a cured product shows a lower physical strength.

Optional Components

The present composition may comprise optional components in addition to the aforesaid components (A) to (F), such as agents for regulating the viscosity, flexibilizers, plasticizers, hydrosilylation reaction retarders, inorganic fillers, adhesion promoters, adhesion aids different from the component (F), and silane coupling agents in such amounts as not to adversely affect the present composition.

An example of the agent for regulating the viscosity or the flexibilizer is represented by the following formula (8)

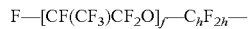

wherein, X' and "a" are as defined above and $R_f^2$ is represented by the following formula

wherein f and h are integers as defined above, provided that f is smaller than both an average of a sum, b+c, and an average of a sum, u+v, in the group, $R_f^1$.

Examples of the polyfluoro monoalkenyl compound of the formula (8) are as shown below.

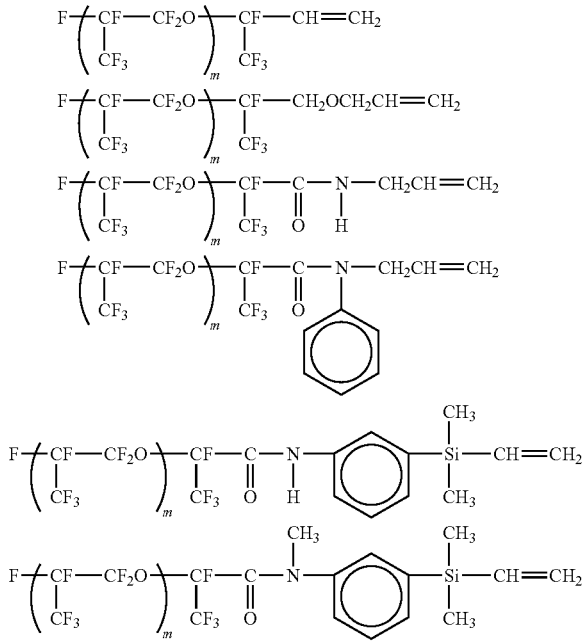

wherein m is a number to meet the aforesaid requirements.

Examples of the plasticizer are depicted in the following formulae (9) and (10):

wherein D is a group of the formula $C_sF_{2s+1}$— with s being an integer of from 1 to 3, c' is an integer of from 1 to 200 and not larger than a sum of an average of (b+c) and L and a sum of an average of u+v in $R_f^1$ in the component (A);

wherein D is the group as defined above, d' and e' are integers of from 1 to 200 with d'+e'≦(the average of b+c)+L and d'+e'≦u+v in $R_f^1$ in the component (A).

Examples of the linear polyfluoro compound of the formulae (9) and (10) are as shown below.

$CF_3O-(CF_2CF_2CF_2O)_n-CF_2CF_3$
$CF_3-[(OCF_2CF_2)_n(OCF_2)_m]-O-CF_3$ wherein m and n are integers of from 1 to 200 and a sum, m+n, meets the aforesaid requirements.

The aforesaid compounds (8) to (10) may be incorporated in an amount of from 1 to 300, preferably 50 to 250, parts by weight per 100 parts by weight of the component (A). Preferably, these compounds have a viscosity ranging from 5 to 100,000 mPa·s at 23 degrees C.

Examples of the retarder for hydrosilylation reaction include acetylenic alcohols such as 1-ethynyl-1-cyclohexano, 3-methyl-1-butyne-3-ol, 3,5-dimethyl-1-hexyne-3-ol, 3-methyl-1-pentyne-3-ol, and phenylbutynol; reaction products of these acetylenic alcohols with chlorosilane substituted with a monovalent fluorine-containing substituent, 3-methyl-3-pentene-1-yene, 3,5-dimethyl-3-hexyene-1-yene, and triarylisocyanurate, a polyvinylsiloxane and organic phosphorus compounds. By using the retarder, curing reactivity and a shelf life of the composition can be controlled.

Examples of the inorganic fillers include reinforcing or semi-reinforcing fillers such as silica powder, fused silica powder, diatomaceous earth, and calcium carbonate; inorganic pigments such as titanium oxide, iron oxide, carbon black, and cobalt aluminate; heat stabilizers such as titanium oxide, iron oxide, carbon black, cerium oxide, cerium hydroxide, zinc carbonate, magnesium carbonate and manganese carbonate; heat conductive agents such as alumina, boron nitride, silicon carbide and metal powders; and electrical conductive agents such as carbon black, silver powder, and conductive zinc white.

Examples of the adhesion aid include carboxylic acid anhydrides and titanate esters.

Method for the Preparation of the Composition

The present composition may be prepared by thoroughly mixing the aforesaid components (A) to (F) and, if desired, optional components in a mixing apparatus such as a planetary mixer, a gate mixer and kneader and, if needed, a three-roll mill.

In the mixing, not all of the components are mixed at a time. In a first step, a part of the component (A), component (D) and component (E) are mixed, wherein the component (D) is added, preferably in several portions, in an amount of 20 to 60 parts by weight per 100 parts by weight of the component (A) now mixed while mixing. The component (E) is added in an amount of from 0.5 to 15 parts by weight per 100 parts by weight of the component (D). The mixing is first carried out without heating until the hydrophobic silica (D) gets thoroughly wet with the other components. In a second step, the mixture obtained in the first step is kneaded with heating under a reduced pressure or heating under pressure, and then the rest of the component (A) is added. In a third step, the remaining components are added to the liquid base compound obtained in the second step and thoroughly mixed until a homogeneous mixture is obtained.

In the first and second steps, a surface of the hydrophobic silica powder(D) becomes free of any adsorbed water, treated with the alkoxysilane (E) and coated with the linear polyfluoro compound (A) to prevent the other component, particularly the component (F), from adsorbing on the surface of the hydrophobic silica (D), whereby a flow property of the composition and adhesion strength are improved. The kneading may be carried out in a planetary mixer, a gate mixer and kneader.

In the first step, the amount of the component (D) to be added to 100 parts by weight of the component (A) varies depending on the type of the hydrophobic silica powder (D) as well as the amount and the type of the alkoxysilane (E). Typically, the amount ranges from 20 to 60 parts by weight. If the amount is less than the aforesaid lower limit, a shearing force is too small to sufficiently wet the component (D) with the component (A), so that the viscosity of the resulting composition may too high. If the amount exceeds the aforesaid upper limit, so much heat generates during mixing that may damage a mixing apparatus.

Heating conditions in the second step are not particularly limited, but preferably heating at a temperature of from 120 to 180 degrees C. for at least 1 hour is employed.

A pressure in the second step may be above or below atmospheric pressured depending on a mixing apparatus used. In a planetary mixer or a gate mixer, a reduced pressure of −0.05 MPa in gage or lower is preferably employed. In a kneader, a gage pressure of 0.4 to 0.6 MPa is preferably employed. Under these conditions, the component (A) easily wets a surface of the component (D) to coat the surface.

In the third step, the present adhesive composition is obtained by adding the components (B), (C) and (F) to the liquid base compound containing the component (A), the component (D) coated with the component (A) and/or with the component (E).

The adhesive composition thus prepared may be cured at room temperature depending on the type of the functional groups in the linear polyfluoro compound (A) and the type of the platinum group metal compound (C). Preferably, heat is applied to promote the curing. To attain stronger adhesion to various substrates, it is preferred to heat the composition at a temperature of 60 degrees C. or higher, more preferably, 100 to 200 degrees C., for a period of from several minutes to several hours.

The present composition may be used in a solution of a desired concentration in a solvent, for example, a fluorinated solvent such as 1,3-bis(trifluoromethyl)benzene, Fluorinert (trade mark, ex 3M Co.), perfluorobutyl methyl ether, and perfluorobutyl ethyl ether. The use of the solvent is particularly preferred for a thin layer coating application.

The present adhesive composition is useful as an adhesive for automobile parts, and electric and electronic parts. For example, the present composition is useful as a sealant or protective coating for pressure sensors, gas concentration detectors, and temperature sensors used in automobile control systems; protective encapsulant for sensors exposed to hot water, various kinds of gases or chemicals; an adhesive for ink jet printers; an adhesive or encapsulant for printer heads; a coating agent for rolls or belts in laser printers or copying machines; and a sealant or coating agent for printed circuit boards.

EXAMPLES

The present invention will be explained in detail below with reference to the Examples, but not limited to them. In the following, "part" means "part by weight." Viscosity and adhesion strength were measured at 23 degrees C.

Example 1

In a planetary mixer, 100 parts of the linear polyfluoro compound of the following formula (11) having a viscosity of 10,000 mPa·s, a number average molecular weight of 17,000 and a vinyl group content of 0.012 mole/100 g were placed, to which 2.0 parts of alkoxysilane of the following formula (12). Then, 25 parts of fumed silica was added in five batches in 2 hours while kneading without heating, which silica had been surface treated with dimethyldichlorosilane and had a BET specific surface area of 110 m$^2$/g and a moisture content of 0.3 wt %. Then, the planetary mixer was heated while mixing so that a temperature of the content of the mixer rose to 150 degrees C. The content was kept at a temperature of from 150 degrees C. to 170 degrees C. for further 2 hours under a reduced pressure of −0.008 MPa gage. Then, the content was cooled below a temperature of 40 degrees C., to which 25 parts of the linear polyfluoro compound of the formula (11) was added and mixed for another 1 hour. The contents thus obtained were kneaded in a three-roller mill for 2 passes, whereby a base compound was obtained.

Forty eight parts of the base compound and 60 parts of the linear polyfluoro compound of the formula (11) having a molecular weight of 18,600 and a vinyl group content of 0.000107 mole/100 g were placed in the planetary mixer and mixed to a homogeneous mixture to which the following components were added and thoroughly mixed in the order described below: 0.2 part of a solution of platinum complex with divinyltetramethyldisiloxane in toluene having a platinum concentration of 0.5 wt %, 0.3 part of a 50% solution of ethynyl cyclohexanol in toluene, 1.6 parts of the organohydrogensiloxane of the following formula (13) having 0.00386 mole/g of SiH bond, 1.1 parts of the organohydrogensiloxane of the following formula (14) having 0.00779 mole/g of SiH bond, 0.5 part of the organosiloxane of the formula (15) having a epoxy group and 1.4 parts of the organosiloxane of the formula (16) having a epoxy group. A ratio of a SiH bond/vinyl group in the compound of the formula (11) was 2.3. By deaerating the mixture thus obtained, the present composition was obtained.

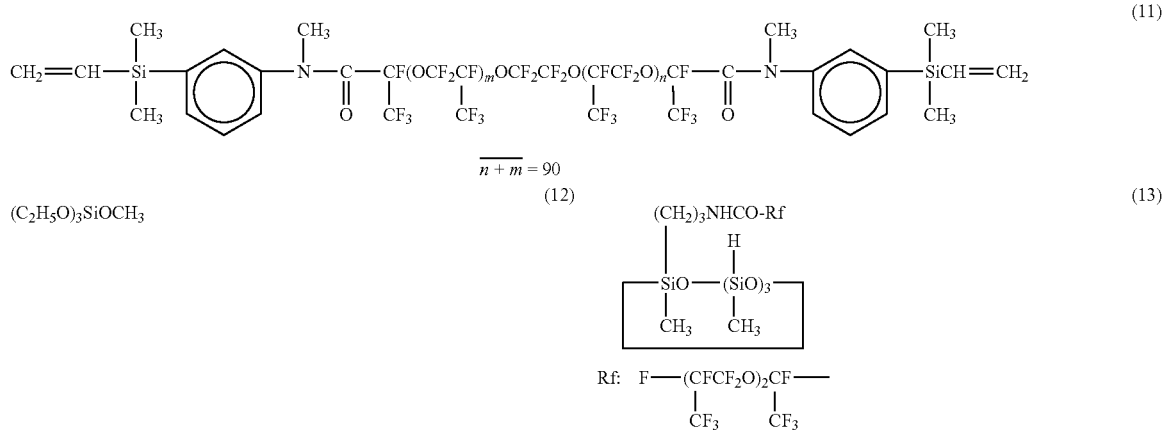

-continued

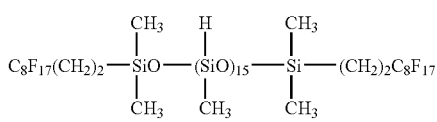
(14)

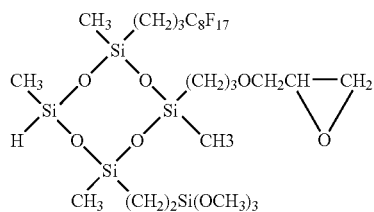
(16)

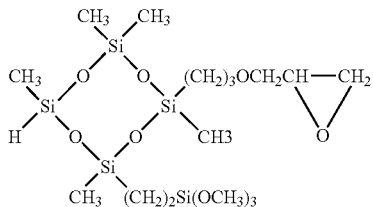
(15)

Shear Adhesion Strength and Cohesive Failure

Two test pieces of 100 mm×25 mm made of one of the materials shown in Table 1 were arranged lengthwise with a 10 mm long end of each test piece overlapped mutually. Between the overlapped parts, 1 mm thick layer of the composition prepared above was applied and heated at 150 degrees C. for 1 hour to cure. The test specimen thus obtained was subjected to measurement of shear adhesion strength by cramping a free end of one of the test pieces and pulling down a free end of the other test piece at a pulling rate of 50 mm/min using a tensile tester. A force at break the bond was measured as initial shear adhesion strength. Then, the ends of the test pieces where the composition was applied were visually observed to determine cohesive failure percentage as a ratio of an area where the cured composition remained to the area where the composition initially applied.

Resistance of the Cured Composition to Pressure, Heat or Gasoline

Test specimens obtained in the same manner as described above were subjected to the following tests conditions and then to the measurements of shear adhesion strength and cohesive failure percentage as described above.

Test A: Pressure cooker test at a temperature of 121 degrees C., and a pressure of 2 atm for 50 hours;

Test B: Heat resistance test at 150 degrees C. for 1000 hours;

Test C: Gasoline resistance test by immersing a test specimen in test fuel oil C at 25 degrees C. for 168 hours.

Example 2

The procedures in Example 1 were repeated, except that 25 parts of fused silica surface-treated with dimethyldichlorosilane having a BET specific surface of 110 m²/g and a moisture content of 0.4 wt % was used in place of the fused silica used in Example 1 and 2.5 parts of alkoxysilane of the following formula (17) was used in place of the alkoxysilane of the formula (12) used in Example 1.

$(CH_3O)_3SiCH(CH_3)COOC_2H_5$ (17)

Example 3

The procedures in Example 1 were repeated, except that 25 parts of fused silica surface-treated with hexamethyldisilazane having a BET specific surface of 120 m²/g and a moisture content of 0.2 wt % was used in place of the fused silica used in Example 1 and 1.5 parts of alkoxysilane of the following formula (18) was used in place of the alkoxysilane of the formula (12) used in Example 1.

$(CH_3O)_3SiCH(CH_3)COOC_8H_{17}\text{-}n$ (18)

Comparative Example 1

The procedures in Example 1 were repeated except that the alkoxysilane of the formula (12) was not used.

Comparative Example 2

The procedures in Example 2 were repeated except that the alkoxysilane of the formula (17) was not used.

Comparative Example 3

The procedures in Example 3 were repeated except that the alkoxysilane of the formula (18) was not used.

The tests results are as shown in the Table 1 wherein the numerals described in parentheses are cohesion failure percentage and "PBT" represents polybutylene terephthalate.

TABLE 1

| | Shear adhsion strength (MPa) | Examples | | | Comparative examples | | |
|---|---|---|---|---|---|---|---|
| | | 1 | 2 | 3 | 1 | 2 | 3 |
| Initial | Aluminum | 2.5 (100) | 2.5 (100) | 2.3 (100) | 24 (100) | 2.2 (90) | 2.2 (100) |
| | Stainless steel | 2.1 (100) | 2.1 (100) | 2.0 (100) | 2.0 (95) | 1.9 (90) | 1.9 (95) |

TABLE 1-continued

| Shear adhsion strength (MPa) | | Examples | | | Comparative examples | | |
|---|---|---|---|---|---|---|---|
| | | 1 | 2 | 3 | 1 | 2 | 3 |
| | Alumina | 2.4 (100) | 2.4 (100) | 2.3 (100) | 2.2 (100) | 2.1 (90) | 2.1 (100) |
| | Epoxy resin | 1.8 (100) | 1.7 (100) | 1.7 (100) | 1.6 (90) | 1.5 (90) | 1.6 (95) |
| | PBT resin | 2.0 (100) | 2.0 (100) | 1.9 (100) | 1.9 (95) | 1.8 (90) | 1.8 (95) |
| After test conditions A | Aluminum | 2.5 (100) | 2.5 (100) | 2.3 (100) | 2.3 (95) | 2.2 (90) | 2.2 (95) |
| | Stainless steel | 21 (100) | 2.1 (100) | 2.0 (100) | 1.9 (90) | 1.8 (85) | 1.8 (90) |
| | Alumina | 2.4 (100) | 2.4 (100) | 2.3 (100) | 2.3 (95) | 2.1 (90) | 2.1 (95) |
| | Epoxy resin | 1.6 (100) | 1.5 (100) | 1.5 (100) | 1.4 (85) | 1.2 (80) | 1.4 (90) |
| | PBT resin | 1.1 (100) | 1.1 (100) | 1.0 (100) | 1.0 (90) | 0.9 (80) | 0.9 (95) |
| After test conditions B | Aluminum | 2.7 (100) | 2.7 (100) | 2.5 (100) | 2.6 (100) | 2.5 (95) | 2.4 (100) |
| | Stainless steel | 2.3 (100) | 2.3 (100) | 2.2 (100) | 2.2 (95) | 2.0 (90) | 2.1 (95) |
| | Alumina | 2.5 (100) | 2.6 (100) | 2.5 (100) | 2.4 (95) | 2.2 (90) | 2.3 (100) |
| | Epoxy resin | 1.6 (100) | 1.5 (100) | 1.5 (100) | 1.4 (90) | 1.3 (90) | 1.4 (95) |
| | PBT resin | 1.8 (100) | 1.8 (100) | 1.7 (100) | 1.7 (90) | 1.6 (85) | 1.6 (90) |
| After test conditions C | Aluminum | 2.2 (100) | 22 (100) | 2.1 (100) | 2.0 (90) | 1.9 (85) | 2.0 (95) |
| | Stainless steel | 1.8 (100) | 1.8 (100) | 1.8 (100) | 1.6 (90) | 1.5 (85) | 1.6 (90) |
| | Alumina | 2.1 (100) | 2.1 (100) | 2.0 (100) | 2.0 (95) | 1.9 (90) | 1.9 (95) |
| | Epoxy resin | 1.6 (100) | 1.5 (100) | 1.5 (100) | 1.4 (85) | 1.2 (80) | 1.4 (90) |
| | PET resin | 1.8 (100) | 1.8 (100) | 1.7 (100) | 1.6 (90) | 1.5 (85) | 1.6 (95) |

As shown in Table 1, the present compositions showed almost 100% cohesive failure, indicating stronger adhesion to the substrates than the compositions of the comparative examples. The cured products obtained from the present compositions had higher resistance than the compositions of the comparative examples. The present composition is useful not only as an adhesive but also as protective sealant and coating.

What is claimed is:

1. A method of preparing an adhesive composition comprising the steps of:
   (i) mixing (A) a linear polyfluoro compound having at least two alkenyl groups per molecule and a perfluoropolyether residue in a main chain of the linear polyfluoro compound (A);
   20 to 60 parts by weight, per 100 parts by weight of component (A), of (D) hydrophobic silica powder; and
   0.5 to 15 parts by weight, per 100 parts by weight of component (D), of an alkoxysilane represented by the following formula (1)

$(RO)_3$—Si-T  (1)

wherein R may be the same as or different from each other and is a monovalent hydrocarbon group, T is a group represented by the formula, —$OR^1$ or —$CHR^2$—$COOR^3$, wherein $R^1$ is a monovalent hydrocarbon group, which may be the same as or different from R, $R^2$ is a hydrogen atom or a methyl group and $R^3$ is a monovalent hydrocarbon group;
   (ii) kneading the mixture obtained in step (i) and then adding component (A) to make a content of component (D) of from 0.5 to 30 parts by weight, per 100 parts by weight of component (A); and
   (iii) adding to the mixture obtained in step (ii) the following components (B), (C), and (F):
   (B) an organohydrogensiloxane having a fluorinated group and at least two SiH bonds per molecule in such an amount that a molar amount of the SiH bond is 0.5 to 3.0 times that of the alkenyl group contained in the component (A);
   (C) 0.1 to 500 ppm of a compound of a platinum group metal in an amount of, calculated as platinum group metal, based on 100 parts by weight of the component (A); and
   0.1 to 10 parts by weight of (F) an organosiloxane having at least one SiH bond and at least one group selected from the group consisting of an epoxy group and a trialkoxysilyl group, said at least one group being bonded to a silicon atom of the organosiloxane (F) via an organic group which may contain an oxygen atom.

2. The method for preparing an adhesive composition according to claim 1, wherein R, $R^1$ and $R^3$ may be the same as or different from each other and are monovalent hydrocarbon groups having 1 to 8 carbon atoms and no aliphatic unsaturated bond.

3. The method for preparing an adhesive composition according to claim 1, wherein the component (A) is represented by the following formula (2)

  (2)

wherein X is —$CH_2$—, —$CH_2O$—, —$CH_2OCH_2$—, or —Y—NR'—CO—, wherein Y is —$CH_2$— or an o-, m-, or p-dimethylsilylphenylene group represented by the following formula (Z)

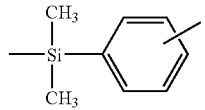  (Z)

and R' is a hydrogen atom or a monovalent hydrocarbon group of which hydrogen atom may be replaced with a halogen atom, X' is —$CH_2$—, —$OCH_2$—, —$CH_2OCH_2$—, or —CO—NR'—Y'—, wherein Y' is —$CH_2$—

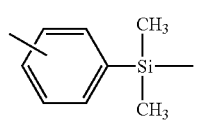  (Z')

or an o-, m-, or p-dimethylsilylphenylene group represented by the following formula (Z') and R' is a hydrogen atom or a monovalent hydrocarbon group of which hydrogen atom may be replaced with a halogen atom, "a" is an integer of 0 or 1 and may be the same with or different from each other; $R_f^1$ is a divalent perfluoropolyether group represented by the following formula (i) or (ii):

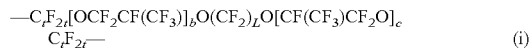

wherein b and c are integers of from 0 to 200 with an average of a sum, b+c, ranging from 2 to 200, L is an integer of from 2 to 6 and t is an integer of 2 or 3,

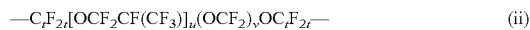

wherein u is an integer of from 1 to 200, v is an integer of from 1 to 50, with an average of a sum, u+v, ranging from 2 to 200, and t is an integer of 2 or 3.

4. The method for preparing an adhesive composition according to claim 1, wherein the organohydrogensiloxane (B) has at least one group selected from the group consisting of perfluoroalkyl groups, perfluoroxyalkyl groups, perfluoroalkylene groups, and perfluoroxyalkylene groups.

5. The method for preparing an adhesive composition according to claim 1, wherein the hydrophobic silica powder (D) is a fumed silica having been surface treated with at least one selected from the group consisting of organochlorosilanes, organodisilazanes, and cyclic organopolysilazanes.

6. The method for preparing an adhesive composition according to claim 1, wherein the organosiloxane (F) has at least one group selected from the group consisting of perfluoroalkyl groups and perfluoroxyalkyl groups, said at least one group being bonded to a silicon atom of organosiloxane (F) via an organic group which may contain an oxygen atom.

7. A part of an automobile control system, characterized in that said part has a protective seal or a coating prepared from the adhesive composition prepared by the method according to any one of the claims 1 to 6.

8. A part of a printer, characterized in that said part has a protective seal or a coating prepared from the adhesive composition prepared by the method according to any one of the claims 1 to 6.

9. A printer comprising the part according to claim 8.

* * * * *